United States Patent [19]
Yoshioka

[11] Patent Number: 5,162,782
[45] Date of Patent: Nov. 10, 1992

[54] DISPLAY DEVICE WITH COORDINATE INPUT FUNCTION

[75] Inventor: Kazuo Yoshioka, Nagasaki, Japan

[73] Assignee: Mitsubishi Denki Kabushiki Kaisha, Tokyo, Japan

[21] Appl. No.: 516,550

[22] Filed: Apr. 30, 1990

[30] Foreign Application Priority Data

Aug. 28, 1989 [JP] Japan .................. 1-221115

[51] Int. Cl.⁵ .............................................. G09G 3/02
[52] U.S. Cl. ........................................ 340/712; 178/18; 359/53
[58] Field of Search ............... 340/706, 716, 765, 784, 340/712; 178/18; 359/53, 103

[56] References Cited

U.S. PATENT DOCUMENTS

| | | | |
|---|---|---|---|
| 4,231,640 | 11/1980 | Funada et al. | 340/716 |
| 4,375,317 | 3/1983 | Funda et al. | 359/54 |
| 4,449,123 | 5/1984 | Muranaga | 340/716 |
| 4,704,501 | 11/1987 | Taguchi et al. | 340/712 |
| 4,841,290 | 6/1989 | Nakano et al. | 340/712 |
| 4,890,096 | 12/1989 | Taguchi et al. | 340/712 |

FOREIGN PATENT DOCUMENTS

| | | |
|---|---|---|
| 3533869 | 3/1986 | Fed. Rep. of Germany . |
| 2557341 | 6/1985 | France . |
| 2595157 | 9/1987 | France . |
| 63-58321 | 3/1988 | Japan . |
| 63-81521 | 4/1988 | Japan . |
| 2156133 | 10/1985 | United Kingdom . |

OTHER PUBLICATIONS

"Flat Panel—Display '90", Nikkei PB, p. 172.
*Patent Abstracts of Japan,* vol. 12, No. 313 (JP 63 081521).
*Patent Abstracts of Japan,* vol. 11, No. 116 (JP 61 262835).
"Double-Layer LCD Displays CRT-Quality Video", *Electronic Design,* vol. 36, No. 24, Oct. 27, 1988, p. 29.

*Primary Examiner*—Alvin E. Oberley
*Assistant Examiner*—Amare Mengistu
*Attorney, Agent, or Firm*—Burns, Doane, Swecker & Mathis

[57] ABSTRACT

In a display device with coordinate input function according to the invention, since transparent electrodes for inputting coordinates, are disposed in an X-Y matrix form on a compensation cell provided to a liquid crystal display panel of two-layer type, the coordinate input can be performed even in the case of employing a liquid crystal display panel divided into two, upper and lower parts to drive its display screen.

2 Claims, 4 Drawing Sheets

DISPLAY DEVICE WITH COORDINATE INPUT FUNCTION

BACKGROUND OF THE INVENTION

1. Field of the Invention

The present invention relates to a display device with coordinate input function by which a man-machine interface is achieved between an electronic computer and its operator.

2. Description of the Prior Art

In the prior art, a liquid crystal display with coordinate input function is disclosed, for example, in Japanese patent application laid-open No 262835/1986 or Japanese patent application laid-open No. 81521/1988.

FIG. 1 is a constitution diagram of a display device with a coordinate input function in an example of the prior art. Also FIG. 2 is a sectional view of a liquid crystal display cell.

In FIGS. 1 and 2, reference numeral 1 designates a liquid crystal display cell where a liquid crystal 10 is sealed between two glass substrates 12, 13, numerals 2 and 3 designate transparent electrodes arranged at a predetermined distance on the glass substrates 12, 13, numerals 4 and 5 designate drive circuits to activate the transparent electrodes 2, 3, numeral 6 designates a control circuit, numeral 7 designates a magnetic field sensor, numeral 8 designates an amplifier to amplify output signals of the magnetic field sensor 7, numeral 11 designates a seal substance to seal the liquid crystal 10 between the glass substrates 12, 13, and numerals 14 and 15 designate polarizing plates.

Next, the operation of this arrangement will be described.

The control circuit 6 supplies an AC signal as a coordinate input detection signal in time sharing with a display drive signal through the drive circuits 4, 5 in sequence to the transparent electrodes 2, 3 arranged on the glass substrates 12, 13 of the liquid crystal display cell 1. As a result, a rotating magnetic field is generated on the periphery of each of the transparent electrodes 2, 3 by the coordinate input detection signal current. If the sensor 7 with a material having electromagnetic induction effect characteristics embedded therein comes close to the field, a detection voltage corresponding to the rotating magnetic field is obtained from the sensor 7. The detection voltage is amplified by the amplifier 8 to a suitable amplitude and then compared in sequence in synchronism with timing of the coordinate input detection signal applied to the transparent electrodes 2, 3, thereby an intersection position of the transparent electrodes 2 and 3 can be detected.

The display device with a coordinate input function of the above-mentioned constitution is advantageous in that display of the image and the coordinate input can be realized by the same transparent electrodes 2, 3 and a special coordinate input panel is not required.

Since the display device with coordinate input function in the prior art is constituted as above described and the coordinate input detection signal current flows through the transparent electrodes, basically, the transparent electrodes 2, 3 must not have a non-conductive part there along. However, liquid crystal display devices in recent years are called upon to have higher resolution, and in order to prevent deterioration in the contrast ratio of the display image, a liquid crystal display panel having a display screen divided into two, upper and lower, separately driven parts is used. Liquid crystal display panels are being significantly advanced, and a liquid crystal display panel of two-layer type to enable the black-and-white display is put to practical use in recent years and also a color liquid crystal display panel in combination of the liquid crystal display panel of two-layer type with a color filter has been developed.

FIG. 3 is a sectional view of a standard liquid crystal display panel of two-layer type in the prior art, and FIG. 4 is a constitution diagram of a liquid crystal display panel divided into two, upper and lower parts in the prior art. In FIGS. 3 and 4, reference numeral 1 designates a liquid crystal display cell, numerals 2U, 2L and 3 designate transparent electrodes, numerals 4U, 4L and 5 designate drive circuits, numeral 6 designates a control circuit, and numeral 21 designates a liquid crystal cell for phase compensation, which is constituted by sealing a liquid crystal 10 between glass substrates 32 and 33 with a seal substance 31 and compensates optical characteristics of the liquid crystal display panel 1. Since details of the principle or the like of the liquid crystal panel of two-layer type shown in FIG. 3 do not have direct relation to the invention, the description shall be omitted here.

As clearly seen from FIG. 4, each of the transparent electrodes arranged in the vertical direction is divided into an upper transparent electrode 2U and a lower transparent electrode 2L corresponding to the dividing of the display screen. In this case, the bottom end of the upper transparent electrode 2U and the top end of the lower transparent electrode 2L are within the liquid crystal display cell 1 and therefore cannot be drawn as electrodes outside the liquid crystal cell 1. Accordingly, the coordinate input detection signal current cannot flow through the transparent electrodes 2U, 2L, and the display device with coordinate input function as shown in FIG. 1 cannot be constituted as in the prior art.

SUMMARY OF THE INVENTION

In order to solve the above-mentioned problems in the prior art, an object of the invention is to provide a display device with a coordinate input function even in case of a liquid crystal display panel having a display screen divided into two, upper and lower parts to be driven separately, by ensuring the coordinate input detection signal current flowing, in a two-layer type liquid crystal display panel.

In order to attain the foregoing object, in a display device with coordinate input function according to the invention, a liquid crystal display panel of the two-layer type with a liquid crystal cell for phase compensation is used, and coordinate input electrodes are arranged in the liquid crystal cell for phase compensation and the coordinate input detection signal current flows through the coordinate input electrodes whereby inputting of the coordinates is performed.

The foregoing and other objects and novel features of the invention will be more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

An embodiment of the invention will now be described referring to the accompanying drawings.

Figure 5:
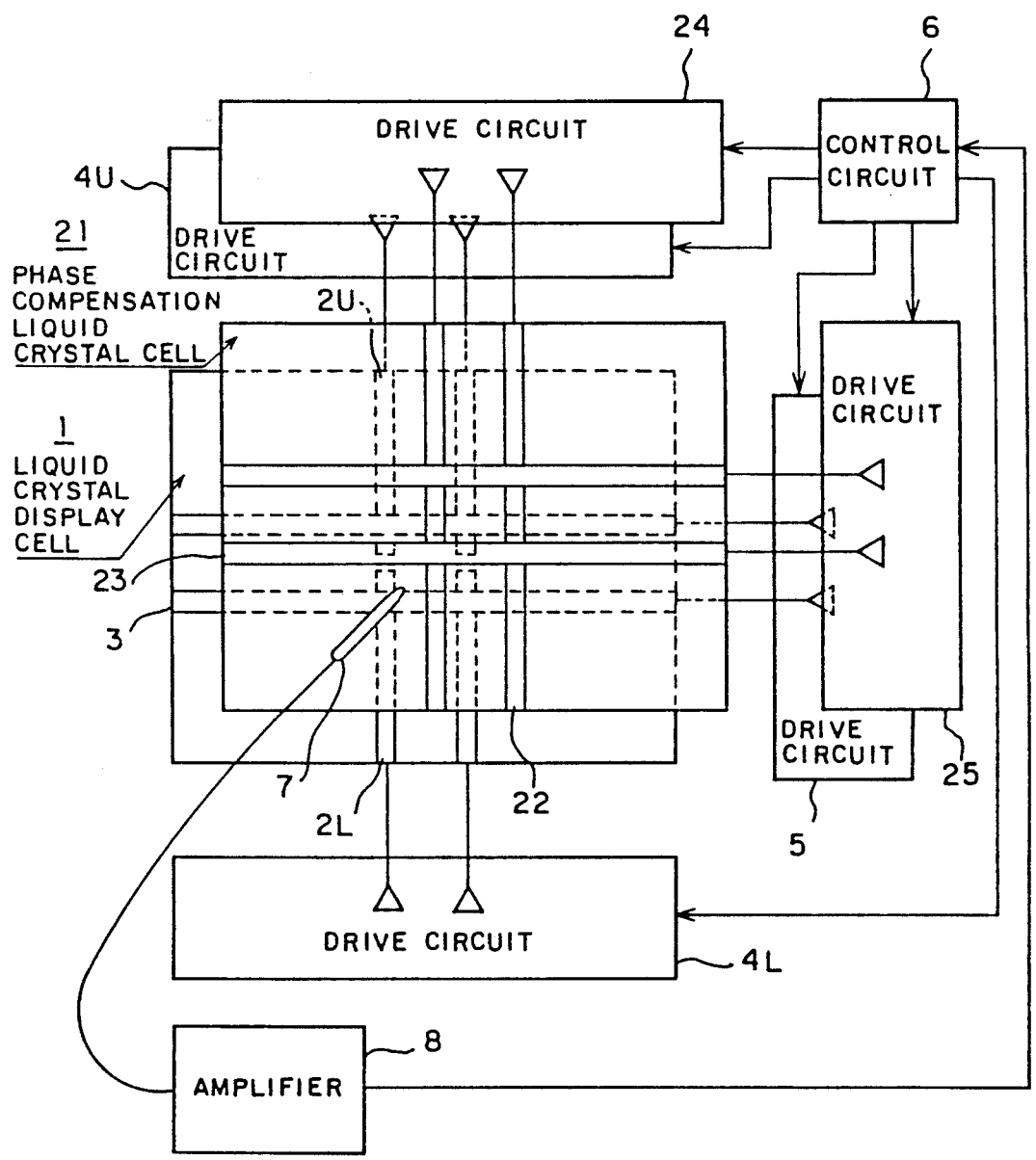
FIG. 5 is a constitution diagram of a display device with coordinate input function according to an embodiment of the invention.

FIG. 5 is a constitution diagram of a display device with coordinate input function as an embodiment of the invention. In FIG. 5, reference numeral 1 designates a liquid crystal display cell, numerals 2U, 2L, 3 designate transparent electrodes for image display, which are arranged on glass substrates 12, 13 (FIG. 6) to constitute the liquid crystal display cell 1, numerals 4U, 4L, 5 designate drive circuits which activate the transparent electrodes 2U, 2L, 3 and drive the liquid crystal display cell 1, numeral 6 designates a control circuit, numeral 7 designates a magnetic field sensor, and numeral 8 designates an amplifier which amplifies output signals of the magnetic field sensor 7. Also numeral 21 designates a liquid crystal cell for phase compensation, numerals 22, 23 designate transparent electrodes for coordinate input, which are arranged on glass substrates 32, 33 to constitute the liquid crystal cell 21 for phase compensation, and numerals 24, 25 designate drive circuits which activate the transparent electrodes 22, 23 and through which the coordinate input detection signal current flows.

Figure 6:
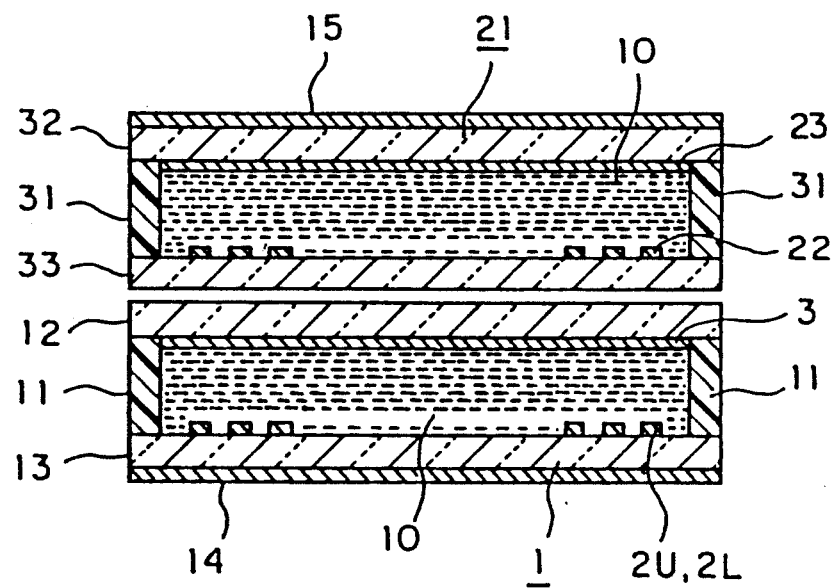
FIG. 6 is a sectional view of a liquid crystal display panel of two-layer type according to the embodiment of the invention.

FIG. 6 is a sectional view of the liquid crystal display panel as the embodiment of the invention. In FIG. 6, reference numeral 1 designates a liquid crystal display cell, numeral 21 designates a liquid crystal cell for phase compensation, numerals 11, 31 designate seal substances which seal a liquid crystal 10 between glass substrates 12, 13 and between glass substrates 32, 33 respectively, and numerals 14, 15 designate polarizing plates.

Figure 1:
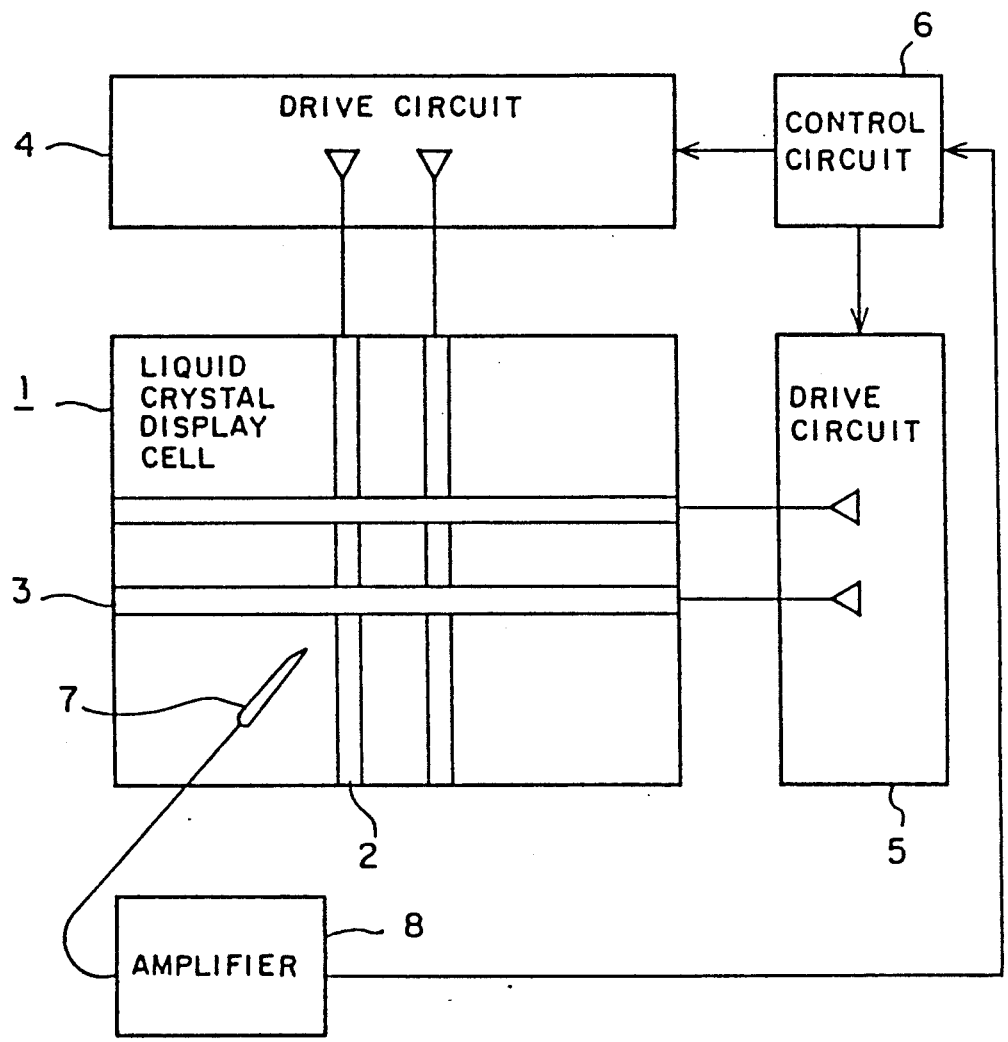
FIG. 1 is a constitution diagram of a display device with coordinate input function in the prior art.
Figure 2:
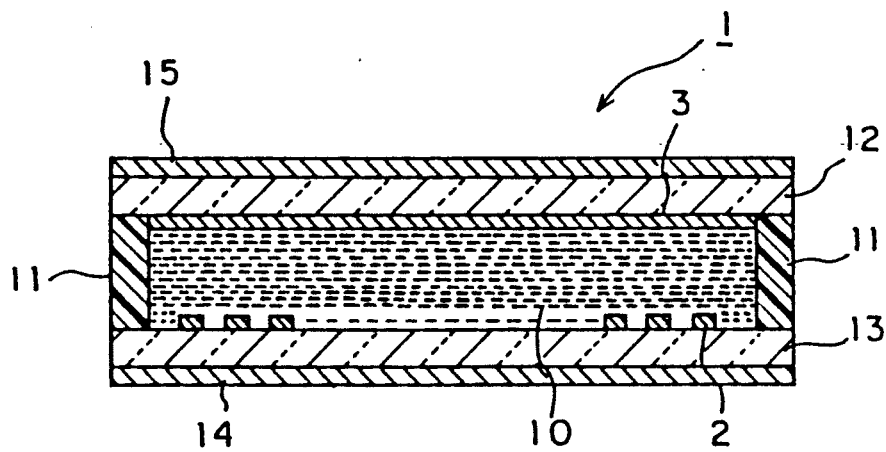
FIG. 2 is a sectional view of a liquid crystal display panel in the prior art.
Figure 4:
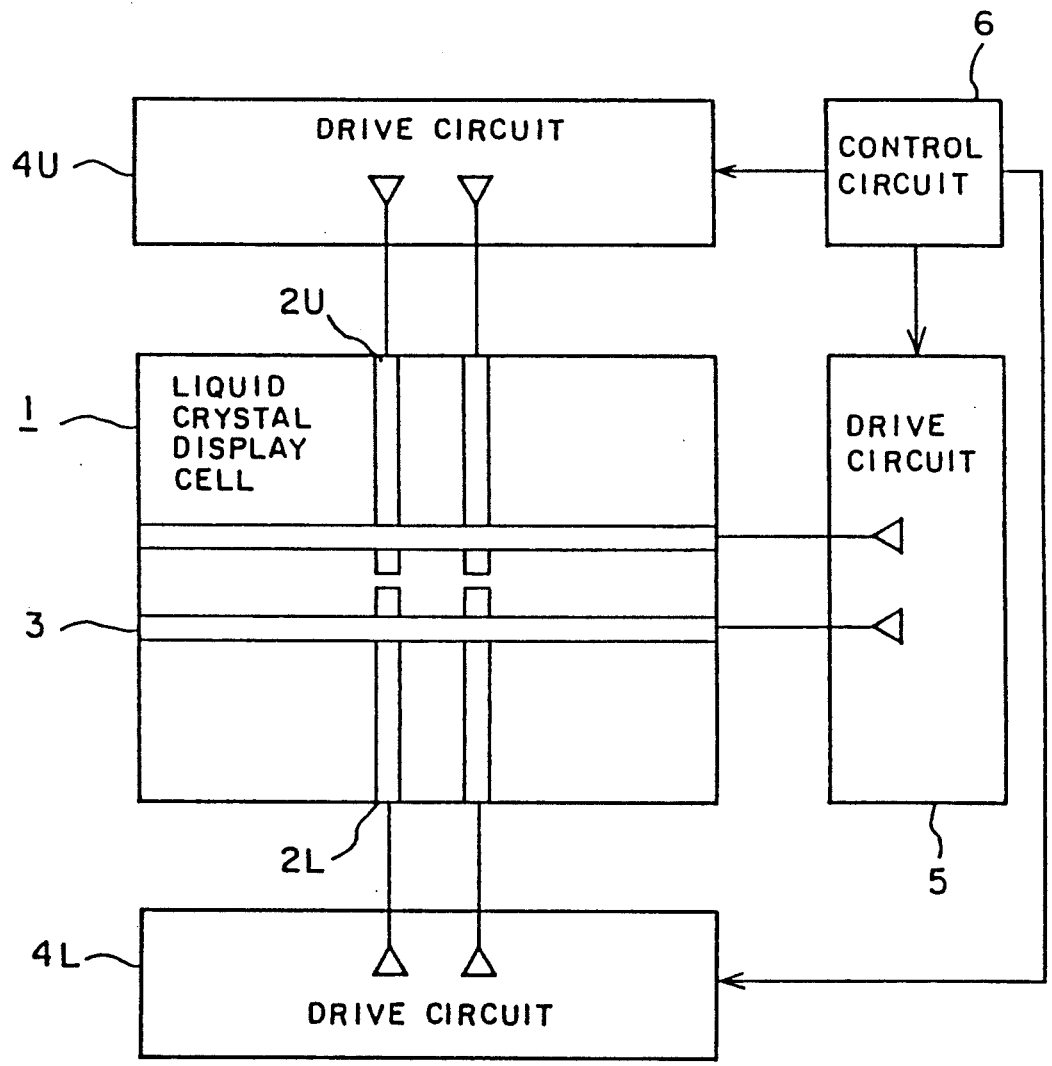
FIG. 4 is a constitution diagram of a liquid crystal display panel divided into two, upper and lower parts in the prior art.
Figure 3:
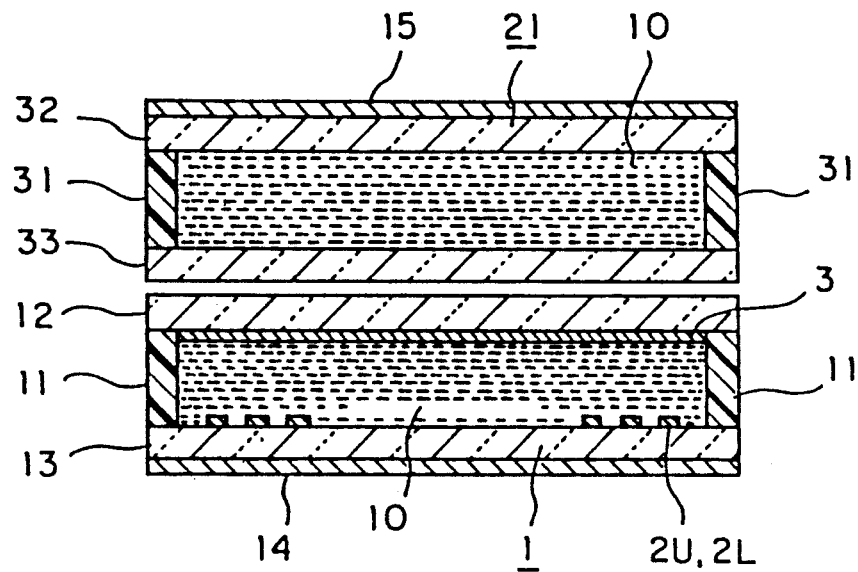
FIG. 3 is a sectional view of a standard liquid crystal display panel of two-layer type in the prior art.

As clearly seen from comparison with FIG. 3 showing a sectional view of the standard liquid crystal display panel of two-layer type in the prior art, in the invention, the glass substrates 32, 33 which constitute the liquid crystal cell 21 for phase compensation of the liquid crystal display panel of two-layer type, are provided with transparent electrodes 22, 23 arranged in an X-Y matrix form, and an AC signal as the coordinate input detection signal is supplied from the control circuit 6 through the drive circuits 24, 25 to the transparent electrodes 22, 23 in sequence. As a result, a rotating magnetic field is generated on the periphery of each of the transparent electrodes 22, 23 by the coordinate input detection signal current. And then, the coordinate input can be detected through process similar to the prior art. Thus even in a liquid crystal display panel having a display screen divided into two, upper and lower parts which are separately driven, the coordinate input detection can be performed.

The liquid crystal cell for phase compensation 21 is an example of a compensation cell to improve the optical characteristics of the liquid crystal cell for display 1, and may be constituted by a film or the like which exhibits optical anisotropy. Although the electromagnetic coupling system is used as coordinate input detection system in the embodiment, the invention is not limited to this.

According to the invention as above described, the liquid crystal cell for phase compensation of the liquid crystal display panel of two-layer type, is provided with transparent electrodes arranged thereon in an X-Y matrix form as the coordinate input detecting electrodes, thereby the display device with coordinate input function can be constituted without using a special coordinate input panel in addition to the display panel even in the case that the liquid crystal display panel is divided into two parts which are separately driven.

What is claimed is:

1. A display device with coordinate input function having a liquid crystal display panel for both displaying images and inputting coordinates, comprising:
   a sensor means for sensing coordinate input detection signals from a control means;
   a liquid crystal display panel of two-layer type including an optical phase liquid crystal compensation cell as a first layer of the liquid crystal display panel and a liquid crystal display cell as a second layer of the liquid crystal display panel; and
   a plurality of transparent electrodes arranged on said compensation cell in an X-Y matrix form, for inputting the coordinate input detection signals to said sensor means.

2. A display device with coordinate input function as set forth in claim 1, wherein an image display screen of the liquid crystal display panel of two-layer type is divided into plural areas to be separately driven.

* * * * *